United States Patent
Klimke et al.

(10) Patent No.: US 11,845,857 B2
(45) Date of Patent: Dec. 19, 2023

(54) POLYPROPYLENE COMPOSITION WITH EXCELLENT STIFFNESS AND IMPACT STRENGTH

(71) Applicants: ABU DHABI POLYMERS CO. LTD. (BOROUGE) L.L.C., Abu Dhabi (AE); BOREALIS AG, Vienna (AT)

(72) Inventors: Katja Klimke, Abu Dhabi (AE); Hans Jozef Francois Van Cauwenberghe, Abu Dhabi (AE)

(73) Assignees: ABU DHABI POLYMERS CO. LTD (BOROUGE) L.L.C., Abu Dhabi (AE); BOREALIS AG, Vienna (AT)

(*) Notice: Subject to any disclaimer, the term of this patent is extended or adjusted under 35 U.S.C. 154(b) by 341 days.

(21) Appl. No.: 17/270,789

(22) PCT Filed: Sep. 10, 2019

(86) PCT No.: PCT/EP2019/074023
§ 371 (c)(1),
(2) Date: Feb. 23, 2021

(87) PCT Pub. No.: WO2020/053164
PCT Pub. Date: Mar. 19, 2020

(65) Prior Publication Data
US 2021/0332226 A1 Oct. 28, 2021

(30) Foreign Application Priority Data

Sep. 12, 2018 (EP) .................................. 18193940

(51) Int. Cl.
| | |
|---|---|
| *C08L 23/16* | (2006.01) |
| *C08L 23/12* | (2006.01) |
| *C08K 5/00* | (2006.01) |
| *C08L 23/14* | (2006.01) |
| *B01J 19/06* | (2006.01) |
| *B01J 19/24* | (2006.01) |
| *C08F 210/16* | (2006.01) |

(52) U.S. Cl.
CPC ............. *C08L 23/142* (2013.01); *B01J 19/06* (2013.01); *B01J 19/245* (2013.01); *B01J 19/2455* (2013.01); *C08F 210/16* (2013.01); *C08K 5/0083* (2013.01); *C08L 23/16* (2013.01); *C08L 2205/025* (2013.01); *C08L 2205/03* (2013.01); *C08L 2205/24* (2013.01); *C08L 2207/02* (2013.01); *C08L 2314/02* (2013.01)

(58) Field of Classification Search
None
See application file for complete search history.

(56) References Cited

U.S. PATENT DOCUMENTS

| | | | | |
|---|---|---|---|---|
| 8,569,412 B2* | 10/2013 | Posch | ..................... | C08L 23/10 524/495 |
| 2002/0188078 A1* | 12/2002 | Castellani | ............... | C08L 23/12 525/240 |
| 2011/0177272 A1* | 7/2011 | De Luca | .................. | C08L 23/10 264/328.14 |
| 2012/0190784 A1* | 7/2012 | Posch | ................... | C08F 297/08 524/495 |
| 2013/0281630 A1 | 10/2013 | Leskinen et al. | | |

FOREIGN PATENT DOCUMENTS

| | | |
|---|---|---|
| AU | 1872199 A | 5/1999 |
| CN | 106414594 A | 2/2017 |
| EP | 0491566 A2 | 6/1992 |
| EP | 0586390 B1 | 5/1997 |
| EP | 0591224 B1 | 2/1998 |
| EP | 0887379 A1 | 12/1998 |
| EP | 2275485 A1 | 1/2011 |
| EP | 3168261 A1 | 5/2017 |
| EP | 3246358 A1 | 11/2017 |
| KR | 2016-0137949 A | 12/2016 |
| KR | 20180051641 A | 5/2018 |
| KR | 20140033225 A | 3/2023 |
| WO | 87/07620 A1 | 12/1987 |

(Continued)

OTHER PUBLICATIONS

Applicant: Abu Dhabi Polymers Co. LTD (Borouge) LLC., et al.; "Polypropylene Composition with Excellent Stiffness and Impact Strength"; European Patent Application No. EP18193940; Extended European Search Report; dated Mar. 7, 2019; 7 pgs.
Hans Zweifel, Plastic Additives Handbook, 6th edition, 2009, pp. 1141-1190.
Zweifel; Plastic Additives Handbook; 5th Edition 2001; pp. 871-873.
J. Brandup, et al.; Polymer Handbook, Third Edition, John Wiley & Sons, Inc.; Mar. 1989; 3 pgs.
Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28,1128-1137.

(Continued)

*Primary Examiner* — Richard A Huhn
(74) *Attorney, Agent, or Firm* — TAROLLI, SUNDHEIM, COVELL & TUMMINO L.L.P.

(57) ABSTRACT

The present invention is directed to a polypropylene composition (C) comprising an α-nucleated heterophasic composition (HECO) comprising a (semi)crystalline polypropylene (PP1), an elastomeric ethylene/propylene copolymer (EPR) and a first α-nucleating agent (NU1), an impact modifier comprising a polyethylene (PE) being a copolymer of ethylene and a $C_4$-$C_{12}$ α-olefin and a second α-nucleating agent (NU2). The present invention is further directed to a method for preparing said polypropylene composition (C) and an article comprising said polypropylene composition (C). The present invention is also directed to the use of a composition comprising a polyethylene (PE) being a copolymer of ethylene and a $C_4$-$C_{12}$ α-olefin and an α-nucleating agent (NU2) as an impact modifier.

17 Claims, No Drawings

(56) References Cited

FOREIGN PATENT DOCUMENTS

| | | | |
|---|---|---|---|
| WO | 92/12182 | A1 | 7/1992 |
| WO | 1992/19653 | A1 | 11/1992 |
| WO | 1992/19658 | A1 | 11/1992 |
| WO | 99/24478 | A1 | 5/1999 |
| WO | 99/24479 | A1 | 5/1999 |
| WO | 9924501 | A1 | 5/1999 |
| WO | 00/68315 | A1 | 11/2000 |
| WO | 2004/000899 | A1 | 12/2003 |
| WO | 2004/111095 | A1 | 12/2004 |
| WO | 2018/019618 | A1 | 2/2018 |

OTHER PUBLICATIONS

Busico, Vincenzo, et al., "Full Assignment of the 13C NMR Spectra or Regioregular Polypropylenes: Methyl and Methylene Region", Macromolecules 1997, 30, 6251-6263.

Busico, Vincenzo, et al., "Microstructure of Polypropylene", Prog. Polym. Sci. 26 (2001) 443-533.

Cheng, et al., "13C NMR Analysis of Ethylene-Propylene Rubbers", Macromolecules 17, 1984, 1950-1955.

Kakugo, Masahiro, et al., "13C NMR Determination of Monomer Sequence Distribution in Ethylene-Propylene Copolymers Prepared with d-TiC13- AI(C2H5)2 CI" Macromolecules 1982, 15, 1150-1152.

Resconi, Luigi, et al., "Selectivity in Propane Polymerization With Metallocene Catalysts", Chem. Rev. 2000, 100, 1253-1345.

Singh, Gurmeet, et al., "Triad Sequence Determination of Ethylene-Propylene Copolymers—Application of Quantitative 13C NMR", Polymer Testing 28 (2009) 475-479.

Wang, Wen-Jun, et al., "Structural Analysis of Ethylene/Propylene Copolymers Synthesized With a Constrained Geometry Catalyst", Macromolecules 2000, 33, 1157-1162.

Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.

Applicant: Abu Dhabi Polymers Co. LTD; "Polypropylene Composition With Excellent Stiffness and Impact Strength"; Chinese Application No. 201980052675.1; Chinese Office Action dated Dec. 1, 2022; 17 pgs.

Tingxin Wang, et al.; Development of PP Impact Copolymer EPF30R; China Academic Journal Electronic Publishing House; http://www.cnki.net; May 13, 2003; 4 pgs.

Applicant; Abu Dhabi Polymers Co. LTD (Borouge) LLC. et al.; "Polypropylene Composition with Excellent Stiffness and Impact Strength"; Korean Application No. 10-2021-7005393; Notice to Submit a Response dated Jul. 6, 2022; 17 pgs.

Korean Application No. 10-2021-7005393, Notice of Allowance dated Jan. 27, 2023.

\* cited by examiner

POLYPROPYLENE COMPOSITION WITH EXCELLENT STIFFNESS AND IMPACT STRENGTH

The present invention is directed to a polypropylene composition (C) comprising an α-nucleated heterophasic composition (HECO) comprising a (semi)crystalline polypropylene (PP1), an elastomeric ethylene/propylene copolymer (EPR) and a first α-nucleating agent (NU1), an impact modifier comprising a polyethylene (PE) being a copolymer of ethylene and a $C_4$-$C_{12}$ α-olefin and a second α-nucleating agent (NU2). The present invention is further directed to a method for preparing said polypropylene composition (C) and an article comprising said polypropylene composition (C). The present invention is also directed to the use of a composition comprising a polyethylene (PE) being a copolymer of ethylene and a $C_4$-$C_{12}$ α-olefin and an α-nucleating agent (NU2) as an impact modifier.

Heterophasic propylene copolymers are widely used for the preparation of moulded articles. Their very basic property profile is usually described by density, flowability, stiffness and impact strength. At a given density and melt flow rate, an excellent stiffness-impact balance is frequently requested, especially for more demanding applications. The balance between stiffness and impact strength is often delicate as high impact strength leads to a significant reduction of stiffness and vice versa.

In case it is desired to downgauge a product made of a polypropylene material, however, it is of high importance that both stiffness and impact strength remain on a high level.

Accordingly, there is a need in the art for a polypropylene material featured by excellent stiffness and impact properties. Said polypropylene material should have a good processability as well.

Therefore, it is an object of the present invention to provide a heterophasic propylene copolymer having an improved stiffness while the impact strength and melt flow rate remain on a high level.

Accordingly, the present invention is directed to Polypropylene composition (C), comprising
 (a) at least 80.0 wt.-% of an α-nucleated heterophasic composition (HECO), comprising
  (a1) a (semi)crystalline polypropylene (PP1),
  (a2) an elastomeric ethylene/propylene copolymer (EPR) dispersed in said (semi)crystalline polypropylene (PP1),
  (a3) a first α-nucleating agent (NU1),
 (b) at least 5.0 wt.-% of a polyethylene (PE) being a copolymer of ethylene and a $C_4$-$C_{12}$ α-olefin, and
 (c) at least 1.4 wt.-% of a second α-nucleating agent (NU2) which is different from the first α-nucleating agent (NU1),
 based on the overall weight of the polypropylene composition (C).

According to one embodiment of the present invention, the heterophasic composition (HECO) has a melt flow rate $MFR_2$ (230° C., 2.16 kg) determined according to ISO 1133 in the range of 5.0 to 40.0 g/10 min.

According to another embodiment of the present invention, the (semi)crystalline polypropylene (PP1) is at least bimodal. Bimodal in the sense of the present invention preferably refers to (semi)crystalline polypropylene (PP1) that comprises at least two (semi)crystalline polypropylene fractions, preferably produced sequentially, with different $MFR_2$ (230° C., 2.16 kg) values determined according to ISO 1133.

According to a further embodiment of the present invention, the heterophasic composition (HECO) has a xylene soluble fraction (XCS) in the range of 5.0 to 30.0 wt.-%.

According to still another embodiment of the present invention, the xylene soluble fraction (XCS) of the heterophasic composition (HECO) has
 i) an ethylene content in the range of 25.0 to 60.0 mol-%, and/or
 ii) an intrinsic viscosity (IV) determined according to DIN ISO 1628/1, October 1999 (in Decalin at 135° C.) in the range of 3.0 to 4.5 dl/g.

According to one embodiment of the present invention, the first α-nucleating agent (NU1) is a polymeric nucleating agent and the second α-nucleating agent (NU2) is a non-polymeric nucleating agent.

It is especially preferred that the first α-nucleating agent (NU1) is a polymeric vinylcycloalkane.

According to another embodiment of the present invention, the second α-nucleating agent (NU2) is selected from the group consisting of talc, salts of diesters of phosphoric acid or mixtures thereof.

According to a further embodiment of the present invention, the polypropylene composition (C) comprises
 (a) 80.0 to 95.0 wt.-% of the heterophasic composition (HECO),
 (b) 5.0 to 15.0 wt.-% of the polyethylene (PE) being a copolymer of ethylene and a $C_4$-$C_{12}$ α-olefin, and
 (c) 1.4 to 5.0 wt.-% of the second α-nucleating agent (NU2).

It is especially preferred that the polyethylene (PE) is a copolymer of ethylene and 1-butene.

According to one embodiment of the present invention, the polyethylene (PE) has
 i) a density in the range of 890 to 940 kg/m³, and/or
 ii) a melt flow rate $MFR_5$ (190° C., 5.0 kg) determined according to ISO 1133 equal or below 3.0 g/10 min.

According to a further embodiment of the present invention, the polypropylene composition (C) has
 i) a flexural modulus determined according to ISO 178 of at least 1400 MPa, and/or
 ii) a Charpy notched impact strength determined according to ISO 179/1eA at 23° C. of at least 8.0 kJ/m².

The present invention is further directed to a method for preparing the polypropylene composition (C) described above, comprising the steps of
 i) preparing the α-nucleated heterophasic propylene copolymer (HECO) in a sequential polymerization process comprising at least three reactors, wherein the (semi)crystalline polypropylene (PP1) is produced in the first and/or second reactor in the presence of the first α-nucleating agent (NU1) and the elastomeric ethylene/propylene copolymer (EPR) is produced in a subsequent reactor, and
 ii) blending the α-nucleated heterophasic propylene copolymer (HECO) obtained in step i) with the polyethylene (PE) being a copolymer of ethylene and a $C_4$-$C_{12}$ α-olefin and the second α-nucleating agent (NU2).

The present invention is also directed to the use of a composition comprising a polyethylene (PE) being a copolymer of ethylene and a $C_4$-$C_{12}$ α-olefin and an α-nucleating agent (NU2) as described above as an impact modifier for an α-nucleated heterophasic composition (HECO) comprising an α-nucleating agent (NU1) as described above.

The present invention is further directed to an article, comprising the polypropylene composition (C) as described above.

It is especially preferred that said article is a car seat, a stroller, a baby walker, a toy, a heavy duty pail or a transport packaging.

In the following, the present invention is described in more detail.

The Polypropylene Composition (C)

The polypropylene composition (C) according to the present invention comprises at least 80.0 wt.-% of a heterophasic propylene copolymer (HECO), said heterophasic propylene copolymer (HECO) comprising a (semi)crystalline polypropylene (PP1), an elastomeric ethylene/propylene copolymer (EPR) dispersed in said (semi)crystalline polypropylene (PP1) and a first α-nucleating agent (NU1), at least 5.0 wt.-% of a polyethylene (PE) being a copolymer of ethylene and a $C_4$-$C_{12}$ α-olefin and at least 1.4 wt.-% of a second α-nucleating agent (NU2) which is different from the first α-nucleating agent (NU1), based on the overall weight of the polypropylene composition (C).

It is preferred that the polypropylene composition (C) comprises the heterophasic propylene copolymer (HECO) and the polyethylene (PE) being a copolymer of ethylene and a $C_4$-$C_{12}$ α-olefin in a weight ratio of 70:30 to 99:1, more preferably in a weight ratio of 80:20 to 98:2, still more preferably in a weight ratio of 85:15 to 95:5, like in a weight ratio of 88:12 to 91:9.

Preferably, the polypropylene composition (C) comprises 80.0 to 95.0 wt.-%, more preferably 84.0 to 93.0 wt.-%, still more preferably 86.0 to 91.0 wt.-%, like 88.0 to 90.0 wt.-% of the heterophasic propylene copolymer (HECO), 5.0 to 15.0 wt.-%, more preferably 7.0 to 13.0 wt.-%, still more preferably 8.0 to 12.0 wt.-%, like 9.0 to 11.0 wt.-% of the polyethylene (PE) being a copolymer of ethylene and a $C_4$-$C_{12}$ α-olefin and 1.4 to 5.0 wt.-%, more preferably 1.6 to 4.0 wt.-%, still more preferably 1.8 to 3.0 wt.-%, like 1.9 to 2.2 wt.-% of the second α-nucleating agent (NU2), based on the overall weight of the polypropylene composition (C).

The polypropylene composition (C) of the present invention may include additives (AD).

Accordingly, it is preferred that the polypropylene composition (C) comprises, more preferably consists of, 80.0 to 95.0 wt.-%, more preferably 84.0 to 93.0 wt.-%, still more preferably 86.0 to 91.0 wt.-%, like 88.0 to 90.0 wt.-% of the heterophasic propylene copolymer (HECO), 5.0 to 15.0 wt.-%, more preferably 7.0 to 13.0 wt.-%, still more preferably 8.0 to 12.0 wt.-%, like 9.0 to 11.0 wt.-% of the polyethylene (PE) being a copolymer of ethylene and a $C_4$-$C_{12}$ α-olefin, 1.4 to 5.0 wt.-%, more preferably 1.6 to 4.0 wt.-%, still more preferably 1.8 to 3.0 wt.-%, like 1.9 to 2.2 wt.-% of the second α-nucleating agent (NU2) and optionally 0.05 to 5 wt.-%, more preferably 0.1 to 3 wt.-% of additives (AD), based on the overall weight of the polypropylene composition (C). The additives (AD) are described in more detail below.

Preferably the polypropylene composition (C) of the invention does not comprise (a) further polymer(s) different to the (semi)crystalline polypropylene (PP1), the elastomeric ethylene/propylene copolymer (EPR) and the polyethylene (PE) being a copolymer of ethylene and a $C_4$-$C_{12}$ α-olefin in an amount exceeding 15 wt.-%, preferably in an amount exceeding 10 wt.-%, more preferably in an amount exceeding 9 wt.-%, based on the overall weight of the polypropylene composition (C).

It is preferred that the polypropylene composition (C) has a moderate melt flow rate. Thus, it is preferred that the melt flow rate $MFR_2$ (230° C., 2.16 kg) determined according to ISO 1133 of the polypropylene composition (C) is in the range of 5.0 to 40.0 g/10 min, more preferably in the range of 9.0 to 30.0 g/10 min, still more preferably in the range of 11.0 to 25.0 g/10 min, like in the range of 13.0 to 20.0 g/10 min.

As outlined above, it is preferred that the polypropylene composition (C) according to the present invention is a rather stiff material. Accordingly, it is preferred that the polypropylene composition (C) has a flexural modulus determined according to ISO 178 of at least 1400 MPa, more preferably in the range of 1400 to 3000 MPa, still more preferably in the range of 1410 to 2000 MPa, like in the range of 1420 to 1800 MPa.

Further, it is preferred that the polypropylene composition (C) according to the present invention has excellent impact properties. Therefore, it is preferred that the polypropylene composition (C) has a Charpy notched impact strength determined according to ISO 179/1eA at 23° C. of at least 8.0 $kJ/m^2$, more preferably in the range of 8.0 to 16.0 $kJ/m^2$, still more preferably in the range of 8.1 to 15.0 $kJ/m^2$.

Preferably, it is desired that the polypropylene composition (C) is thermo mechanically stable. Accordingly, it is appreciated that the polypropylene composition (C) has a melting temperature of at least 160° C., more preferably in the range of 162 to 170° C., still more preferably in the range of 163 to 168° C.

The polypropylene composition (C) according to the present invention is prepared by a method comprising the steps of i) preparing the α-nucleated heterophasic propylene copolymer (HECO) in a sequential polymerization process comprising at least three reactors, wherein the (semi)crystalline polypropylene (PP1) is produced in the first and/or second reactor in the presence of the first α-nucleating agent (NU1) and the elastomeric ethylene/propylene copolymer (EPR) is produced in a subsequent reactor, and ii) blending the α-nucleated heterophasic propylene copolymer (HECO) obtained in step i) with the polyethylene (PE) being a copolymer of ethylene and a $C_4$-$C_{12}$ α-olefin and the second α-nucleating agent (NU2).

The process for preparing the heterophasic propylene copolymer (HECO) is described in more detail below.

In the following, the heterophasic propylene copolymer (HECO) comprising a (semi)crystalline polypropylene (PP1), an elastomeric ethylene/propylene copolymer (EPR) dispersed in said (semi)crystalline polypropylene (PP1) and a first α-nucleating agent (NU1), the polyethylene (PE) being a copolymer of ethylene and a $C_4$-$C_{12}$ α-olefin and the a second α-nucleating agent (NU2) are described in more detail.

The Heterophasic Propylene Copolymer (HECO)

The inventive polypropylene composition (C) comprises a heterophasic propylene copolymer (HECO).

The heterophasic propylene copolymer (HECO) according to this invention comprises a matrix (M) being the (semi)crystalline polypropylene (PP1) and dispersed therein an elastomeric propylene copolymer being the elastomeric ethylene/propylene copolymer (EPR). Thus the matrix (M) contains (finely) dispersed inclusions being not part of the matrix (M) and said inclusions contain the elastomeric propylene copolymer. The term inclusion indicates that the matrix (M) and the inclusion form different phases within the heterophasic propylene copolymer (HECO). The presence of second phases or the so called inclusions are for instance visible by high resolution microscopy, like electron microscopy or atomic force microscopy, or by dynamic mechanical thermal analysis (DMTA). Specifically, in DMTA the presence of a multiphase structure can be identified by the presence of at least two distinct glass transition temperatures.

Accordingly, the heterophasic propylene copolymer (HECO) according to this invention preferably comprises
(a) the (semi)crystalline propylene polymer (PP1) as the matrix (M) and
(b) the elastomeric ethylene/propylene copolymer (EPR) as the dispersed phase.

It is preferred that the overall amount of the elastomeric ethylene/propylene copolymer (EPR) within the heterophasic propylene copolymer (HECO) is rather low. Therefore, it is preferred that the weight ratio between the (semi)crystalline propylene polymer (PP1) and the elastomeric ethylene/propylene copolymer (EPR) [PP1/EPR] of the heterophasic propylene copolymer (HECO) is in the range of 99/1 to 40/60, more preferably in the range of 95/5 to 60/40, yet more preferably in the range of 93/7 to 70/30, like in the range of 90/10 to 80/20.

Preferably, the heterophasic propylene copolymer (HECO) according to this invention comprises as polymer components only the (semi)crystalline propylene polymer (PP1) and the elastomeric ethylene/propylene copolymer (EPR). In other words, the heterophasic propylene copolymer (HECO) may contain further additives but no other polymer in an amount exceeding 5.0 wt.-%, more preferably exceeding 3.0 wt.-%, like exceeding 1.0 wt.-%, based on the total heterophasic propylene copolymer (HECO). One additional polymer which may be present in such low amounts is a polyethylene which is a reaction-by-product obtained by the preparation of the heterophasic propylene copolymer (HECO). Accordingly, it is in particular appreciated that the heterophasic propylene copolymer (HECO) contains only the (semi)crystalline propylene polymer (PP1), the elastomeric ethylene/propylene copolymer (EPR) and optionally polyethylene in amounts as mentioned in this paragraph.

The heterophasic propylene copolymer (HECO) applied according to this invention is featured by a moderate melt flow rate. Accordingly, the heterophasic propylene copolymer (HECO) has a melt flow rate $MFR_2$ (230° C., 2.16 kg) determined according to ISO 1133 in the range of 5.0 to 40.0 g/10 min, preferably in the range of 8.0 to 35.0 g/10 min, more preferably in the range of 10.0 to 25.0 g/10 min, like in the range of 12.0 to 20.0 g/10 min.

Preferably, it is desired that the heterophasic propylene copolymer (HECO) is thermo mechanically stable. Accordingly, it is appreciated that the heterophasic propylene copolymer (HECO) has a melting temperature of at least 160° C., more preferably in the range of 162 to 170° C., still more preferably in the range of 163 to 168° C.

The heterophasic propylene copolymer (HECO) comprises apart from propylene also comonomers. Preferably the heterophasic propylene copolymer (HECO) comprises apart from propylene ethylene and/or $C_4$ to $C_8$ α-olefins. Accordingly, the term "propylene copolymer" according to this invention is understood as a polypropylene comprising, preferably consisting of, units derivable from
(a) propylene
and
(b) ethylene and/or $C_4$ to $C_8$ α-olefins.

Thus, the heterophasic propylene copolymer (HECO), i.e. (semi)crystalline polypropylene (PP1) as well as the elastomeric ethylene/propylene copolymer (EPR), can comprise monomers copolymerizable with propylene, for example comonomers such as ethylene and/or $C_4$ to $C_8$ α-olefins, in particular ethylene and/or $C_4$ to $C_8$ α-olefins, e.g. 1-butene and/or 1-hexene. Preferably, the heterophasic propylene copolymer (HECO) according to this invention comprises, especially consists of, monomers copolymerizable with propylene from the group consisting of ethylene, 1-butene and 1-hexene. More specifically, the heterophasic propylene copolymer (HECO) of this invention comprises—apart from propylene—units derivable from ethylene and/or 1-butene. In a preferred embodiment, the heterophasic propylene copolymer (HECO) according to this invention comprises units derivable from ethylene and propylene only. Still more preferably the (semi)crystalline polypropylene (PP1) as well as the elastomeric ethylene/propylene copolymer (EPR) of the heterophasic propylene copolymer (HECO1) contain the same comonomers, like ethylene. Additionally, it is appreciated that the heterophasic propylene copolymer (HECO) preferably has a low total comonomer content, preferably ethylene content. Thus, it is preferred that the comonomer content of the heterophasic propylene copolymer (HECO) is in the range of 2.0 to 15.0 mol-%, preferably in the range of 3.0 to 13.0 mol-%, more preferably in the range of 4.0 to 10.0 mol-%, like in the range of 5.0 to 8.0 mol-%. It is further preferred that the comonomer content of the heterophasic propylene copolymer (HECO) is in the range of 2.0 to 15.0 mol-%, preferably in the range of 2.0 to <12.0 mol-% or 2.0 to 11.0 mol-%, preferably in the range of 3.0 to 13.0 mol-%, preferably 3.0 to <12.0 mol-%, further preferred in the range of 3.0 to 11.0 mol-%, more preferably in the range of 4.0 to 10.0 mol-%, like in the range of 5.0 to 8.0 mol-%.

The xylene cold soluble (XCS) fraction measured according to according ISO 16152 (25° C.) of the heterophasic propylene copolymer (HECO) is preferably in the range of 5.0 to 30.0 wt.-%, more preferably in the range of 7.0 to 25.0 wt.-%, still more preferably in the range of 8.0 to 20.0 wt.-%, like in the range of 9.0 to 15.0 wt.-%, based on the overall weight of the heterophasic propylene copolymer (HECO).

Further it is appreciated that the xylene cold soluble (XCS) fraction of the heterophasic propylene copolymer (HECO) is specified by its intrinsic viscosity. For the present invention it is preferred that the xylene cold soluble fraction (XCS) of the heterophasic propylene copolymer (HECO) has an intrinsic viscosity (IV) measured according to ISO 1628/1 (at 135° C. in decalin) in the range of 3.0 to 4.5 dl/g, more preferably in the range of 3.1 to 4.4 dl/g, still more preferably in the range of 3.2 to 4.4 dl/g.

Additionally, it is preferred that the comonomer content, i.e. ethylene content, of the xylene cold soluble (XCS) fraction of the heterophasic propylene copolymer (HECO) is in the range of 25.0 to 60.0 mol-%, more preferably in the range of 37.0 to 55.0 mol-%, still more preferably in the range of 40.0 to 50.0 mol-%, like in the range of 43.0 to 49.0 mol.-%. The comonomers present in the xylene cold soluble (XCS) fraction are those defined above for the (semi)crystalline polypropylene (PP1) and the elastomeric ethylene/propylene copolymer (EPR), respectively. In one preferred embodiment the comonomer is ethylene only.

The heterophasic propylene copolymer (HECO) can be further defined by its individual components, i.e. the (semi) crystalline polypropylene (PP1) and the elastomeric ethylene/propylene copolymer (EPR).

The (semi)crystalline polypropylene (PP1) can be a propylene copolymer (R-PP1) or a propylene homopolymer (H-PP1), the latter being preferred.

In case the (semi)crystalline polypropylene (PP1) is a propylene copolymer (R-PP1), the (semi)crystalline polypropylene (PP1) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the (semi)crystalline polypropylene (PP1) according to this invention comprises, especially consists of, monomers copolymerizable with propylene from the group consisting of ethylene, 1-butene and 1-hexene. More specifically the (semi)crystalline polypropylene (PP1) of this invention comprises—apart from propylene—units derivable from ethylene and/or 1-butene. In a preferred embodiment the (semi)crystalline polypropylene (PP1) comprises units derivable from ethylene and propylene only.

The (semi)crystalline polypropylene (PP1) according to this invention preferably has a melt flow rate $MFR_2$ (230° C./2.16 kg) measured according to ISO 1133 in the range of 10.0 to 60.0 g/10 min, more preferably in the range of 12.0 to 50.0 g/10 min, still more preferably in the range of 14.0 to 45.0 g/10 min, like in the range of 16.0 to 42.0 g/10 min.

The comonomer content of the (semi)crystalline polypropylene (PP1) is in the range of 0.0 to 5.0 mol-%, yet more preferably in the range of 0.0 to 3.0 mol-%, still more preferably in the range of 0.0 to 1.0 mol-%. It is especially preferred that the (semi)crystalline polypropylene (PP1) is a propylene homopolymer.

Further, it is preferred that the (semi)crystalline polypropylene (PP1) is at least bimodal, like a bimodal propylene homopolymer (H-PP1).

Accordingly, the (semi)crystalline polypropylene (PP1) preferably comprises at least two polymer fractions, like two or three polymer fractions, all of them are propylene homopolymers. Even more preferably, the (semi)crystalline polypropylene (PP1) comprises, preferably consists of, a first (semi)crystalline polypropylene fraction (PP1a) and a second (semi)crystalline polypropylene fraction (PP1b). Still more preferably, the (semi)crystalline polypropylene (PP1) comprises a first propylene homopolymer fraction (H-PP1a) and a second propylene homopolymer fraction (H-PP1b). Still yet more preferably the (semi)crystalline polypropylene (PP1) is a propylene homopolymer (H-PP1) comprising, preferably consisting of, a first propylene homopolymer fraction (H-PP1a) and a second propylene homopolymer fraction (H-PP1b).

Preferably, the first (semi)crystalline polypropylene fraction (PP1a) and the second (semi)crystalline polypropylene fraction (PP1b), like the first propylene homopolymer fraction (H-PP1a) and the second propylene homopolymer fraction (H-PP1b), differ in melt flow rate.

Accordingly, one of the (semi)crystalline polypropylene fractions (PP1a) and (PP1b), like one of the propylene homopolymer fractions (H-PP1a) and (H-PP1b), of the (semi)crystalline polypropylene (PP1) is the low melt flow rate $MFR_2$ (230° C./2.16 kg) fraction and the other fraction is the high melt flow rate $MFR_2$ (230° C./2.16 kg) fraction, wherein further the low melt flow rate fraction and the high melt flow rate fraction fulfil in-equation (I), more preferably in-equation (Ia), still more preferably in-equation (Ib), $$\frac{MFR(\text{high})}{MFR(\text{low})} \geq 2.0, \tag{I}$$

$$8.0 \geq \frac{MFR(\text{high})}{MFR(\text{low})} \geq 2.3, \tag{Ia}$$

$$6.2 \geq \frac{MFR(\text{high})}{MFR(\text{low})} \geq 2.5, \tag{Ib}$$

wherein
MFR (high) is the melt flow rate $MFR_2$ (230° C./2.16 kg) determined according to ISO 1133 in [g/10 min] of the (semi)crystalline polypropylene fractions, like of the propylene homopolymer fraction, with the higher melt flow rate and MFR (low) is the melt flow rate $MFR_2$ (230° C./2.16 kg) determined according to ISO 1133 in [g/10 min] of the (semi)crystalline polypropylene fractions, like of the propylene homopolymer fraction, with the lower melt flow rate.

Preferably, the first (semi)crystalline polypropylene fraction (PP1a), like the first propylene homopolymer fraction (H-PP1a), is the fraction with the higher melt flow rate $MFR_2$ (230° C./2.16 kg) and the second (semi)crystalline polypropylene fraction (PP1b), like the second propylene homopolymer fraction (H-PP1b), is the fraction with the lower melt flow rate $MFR_2$ (230° C./2.16 kg).

Accordingly, it is preferred that the first (semi)crystalline polypropylene fraction (PP1a), like the first propylene homopolymer fraction (H-PP1a), has a melt flow rate $MFR_2$ (230° C./2.16 kg) in the range of 30.0 to 120.0 g/10 min, more preferably in the range of 32.0 to 100.0 g/10 min, still more preferably in the range of 35.0 to 97.0 g/10 min and/or that the second (semi)crystalline polypropylene fraction (PP1b), like the second propylene homopolymer fraction (H-PP1b), has a melt flow rate $MFR_2$ (230° C./2.16 kg) in the range of 5.0 to 25.0 g/10 min, more preferably in the range of 7.0 to 21.0 g/10 min, still more preferably in the range of 8.0 to 19.0 g/10 min.

Further, the weight ratio between the first (semi)crystalline polypropylene fraction (PP1b), like the first propylene homopolymer fraction (H-PP1a), and the second (semi)crystalline polypropylene fraction (PP1b), like the second propylene homopolymer fraction (H-PP1b), preferably is 20:80 to 80:20, more preferably 75:25 to 25:75, still more preferably 55:45 to 45:55.

The heterophasic propylene copolymer (HECO) preferably comprises 60.0 to 99.0 wt.-%, more preferably 80.0 to 95.0 wt.-%, still more preferably 85.0 to 90.0 wt.-% of the (semi)crystalline polypropylene (PP1), based on the total weight of the heterophasic propylene copolymer (HECO).

Additionally, the first heterophasic propylene copolymer (HECO) preferably comprises 1.0 to 40.0 wt.-%, more preferably 5.0 to 20.0 wt.-%, still more preferably 10.0 to 15.0 wt.-% of the elastomeric ethylene/propylene copolymer (EPR), based on the total weight of the heterophasic propylene copolymer (HECO).

Thus, it is appreciated that the heterophasic propylene copolymer (HECO) preferably comprises, more preferably consists of, 60.0 to 99.0 wt.-%, more preferably 80.0 to 95.0 wt.-%, still more preferably 85.0 to 90.0 wt.-% of the (semi)crystalline polypropylene (PP1), and 1.0 to 40.0 wt.-%, more preferably 5.0 to 20.0 wt.-%, still more preferably 10.0 to 15.0 wt.-% of the elastomeric ethylene/propylene copolymer (EPR), based on the total weight of the heterophasic propylene copolymer (HECO).

Accordingly, a further component of the heterophasic propylene copolymer (HECO) is the elastomeric ethylene/propylene copolymer (EPR) dispersed in the matrix (M) being the (semi)crystalline polypropylene (PP1). Concerning the comonomers used in the elastomeric ethylene/propylene copolymer (EPR) it is referred to the information provided for the heterophasic propylene copolymer (HECO). Accordingly, the elastomeric ethylene/propylene copolymer (EPR) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the elastomeric ethylene/propylene copolymer (EPR) comprises, especially consists of, monomers copolymerizable with propylene from the group consisting of ethylene, 1-butene and 1-hexene. More specifically, the elastomeric ethylene/propylene copolymer (EPR) comprises—apart from propylene—units derivable from ethylene and/or 1-butene. Thus, in an especially preferred embodiment the elastomeric ethylene/propylene copolymer (EPR) comprises units derivable from ethylene and propylene only.

The comonomer content, preferably ethylene content, of the elastomeric propylene copolymer (E) preferably is in the range of 25.0 to 60.0 mol-%, more preferably in the range of 37.0 to 55.0 mol-%, still more preferably in the range of 40.0 to 50.0 mol.-%, like in the range of 43.0 to 49.0 mol.-%.

Further, the heterophasic propylene copolymer (HECO) comprises a first α-nucleating agent (NU1). Accordingly, it is preferred that the heterophasic propylene copolymer (HECO) is free of β-nucleating agents. The first α-nucleating agent (NU1) is preferably selected from the group consisting of
   (i) salts of monocarboxylic acids and polycarboxylic acids, e.g. sodium benzoate or aluminum tert-butylbenzoate, and
   (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
   (iii) salts of diesters of phosphoric acid, e.g. sodium 2,2'-methylenebis (4, 6,-di-tert-butylphenyl) phosphate or aluminum-hydroxy-bis[2,2'-methylene-bis(4,6-di-t-butylphenyl)phosphate], and
   (iv) vinylcycloalkane polymer and vinylalkane polymer (as discussed in more detail below), and
   (v) mixtures thereof.

Such additives are generally commercially available and are described, for example, in "Plastic Additives Handbook", pages 871 to 873, 5th edition, 2001 of Hans Zweifel.

Preferably the heterophasic propylene copolymer (HECO), contains up to 5.0 wt.-% of the first α-nucleating agent (NU1). In a preferred embodiment, the heterophasic propylene copolymer (HECO) contains not more than 500 ppm, more preferably of 0.025 to 200 ppm, more preferably of 0.1 to 200 ppm, still more preferably 0.3 to 200 ppm, most preferably 0.3 to 100 ppm of the first α-nucleating agent (NU1), in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, sodium 2,2'-methylenebis (4, 6,-di-tert-butylphenyl) phosphate, vinylcycloalkane polymer, vinylalkane polymer, and mixtures thereof.

It is particularly preferred that the first α-nucleating agent (NU1) is a polymeric α-nucleating agent.

Accordingly, it is preferred that the first α-nucleating agent (NU1) is vinylcycloalkane polymer and/or a vinylalkane polymer. It is especially preferred that the first α-nucleating agent (NU1) is vinylcycloalkane polymer as described in more detail below.

The heterophasic propylene copolymer (HECO) as defined in the instant invention may contain up to 5.0 wt.-% additives, like antioxidants as well as slip agents and antiblocking agents. Preferably the additive content (without α-nucleating agents) is below 3.0 wt.-%, like below 1.0 wt.-%.

The heterophasic propylene copolymer (HECO) can be produced by blending the (semi)crystalline polypropylene (PP1), the elastomeric ethylene/propylene copolymer (EPR) and the first α-nucleating agent (NU1). However, it is preferred that the heterophasic propylene copolymer (HECO) is produced in a sequential step process, using reactors in serial configuration and operating at different reaction conditions. As a consequence, each fraction prepared in a specific reactor may have its own molecular weight distribution and/or comonomer content distribution.

The heterophasic propylene copolymer (HECO) according to this invention is preferably produced in a sequential polymerization process, i.e. in a multistage process, known in the art, wherein the (semi)crystalline polypropylene (PP1) is produced at least in one slurry reactor, preferably in a slurry reactor and optionally in a subsequent gas phase reactor, and subsequently the elastomeric ethylene/propylene copolymer (EPR) is produced at least in one, i.e. one or two, gas phase reactor(s).

Accordingly it is preferred that the heterophasic propylene copolymer (HECO) is produced in a sequential polymerization process comprising the steps of
   (a) polymerizing propylene and optionally ethylene and/or $C_4$ to $C_8$ α-olefin in a first reactor (R1) obtaining a first (semi)crystalline polypropylene fraction (PP1a), like a first propylene homopolymer fraction (H-PP1a),
   (b) transferring the first (semi)crystalline polypropylene fraction (PP1a), like the first propylene homopolymer fraction (H-PP1a), into a second reactor (R2),
   (c) polymerizing in the second reactor (R2) and in the presence of said first (semi)crystalline polypropylene fraction (PP1a), like in the presence of said first propylene homopolymer fraction (H-PP1a), propylene and optionally ethylene and/or $C_4$ to $C_8$ α-olefin, thereby obtaining the second (semi)crystalline polypropylene fraction (PP1b), like the second propylene homopolymer fraction (H-PP1b);
   preferably the first (semi)crystalline polypropylene fraction (PP1a), like the first propylene homopolymer fraction (H-PP1a), and the second (semi)crystalline polypropylene fraction (PP1b), like the second propylene homopolymer fraction (H-PP1b), are the (semi)crystalline propylene polymer (PP1), like the propylene homopolymer (H-PP1);
   (d) transferring the (semi)crystalline propylene polymer (PP1), like the propylene homopolymer (H-PP1), of step (c) into a third reactor (R3),
   (e) polymerizing in the third reactor (R3) and in the presence of the (semi)crystalline propylene polymer (PP1), like in the presence of the propylene homopolymer (H-PP1), obtained in step (c) propylene and ethylene to obtain the elastomeric ethylene/propylene copolymer (EPR);
   the (semi)crystalline propylene polymer (PP1), like the propylene homopolymer (H-PP1), and the elastomeric ethylene/propylene copolymer (EPR) form the heterophasic propylene copolymer (HECO).

Of course, in the first reactor (R1) the second polypropylene fraction can be produced and in the second reactor (R2) the first polypropylene fraction can be obtained.

Preferably between the second reactor (R2) and the third reactor (R3) the monomers are flashed out.

The term "sequential polymerization process" indicates that the heterophasic propylene copolymer (HECO) is produced in at least two, like three or four reactors connected in series. Accordingly, the present process comprises at least a first reactor (R1) and a second reactor (R2), more preferably a first reactor (R1), a second reactor (R2), and a third reactor (R3). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) is preferably a gas phase reactor (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2) and the third reactor (R3) are gas phase reactors (GPR). Accordingly for the instant process at least three, preferably three polymerization reactors, namely a slurry reactor (SR), like a loop reactor (LR), a first gas phase reactor (GPR-1) and a second gas phase reactor (GPR-2) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) is a gas phase reactors (GPR). Accordingly for the instant process at least three, preferably three polymerization reactors, namely two slurry reactors (SR), like two loop reactors (LR), and a gas phase reactor (GPR-1) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the first heterophasic propylene copolymer (HECO) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3), preferably in the second gas phase reactor (GPR-2) is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention for preparing the heterophasic composition (HECO) is prepared by
a) reacting a spray crystallized or emulsion solidified adduct of MgCl₂ and a C₁-C₂ alcohol with TiCl₄
b) reacting the product of stage a) with a dialkylphthalate of formula (I)

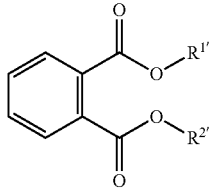

(I)

wherein R¹' and R²' are independently at least a C₅ alkyl under conditions where a transesterification between said C₁ to C₂ alcohol and said dialkylphthalate of formula (I) takes place to form the internal donor
c) washing the product of stage b) or
d) optionally reacting the product of step c) with additional TiCl₄.

The procatalyst is produced as defined for example in the patent applications WO 87/07620, WO 92/19653, WO 92/19658 and EP 0 491 566. The content of these documents is herein included by reference.

First an adduct of MgCl₂ and a C₁-C₂ alcohol of the formula MgCl₂*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula MgCl₂*nROH, wherein R is methyl or ethyl, preferably ethyl and n is 1 to 6, is contacting with TiCl₄ to form a titanized carrier, followed by the steps of
adding to said titanised carrier
(i) a dialkylphthalate of formula (I) with R¹' and R²' being independently at least a C₅-alkyl, like at least a C₅-alkyl,
or preferably
(ii) a dialkylphthalate of formula (I) with R¹' and R²' being the same and being at least a C₅-alkyl, like at least a C₅-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol.-%, more preferably 90 mol.-%, most preferably 95 mol.-%, of a dialkylphthalate of formula (II)

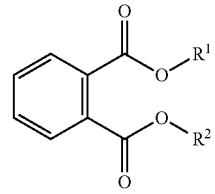

(II)

with R¹ and R² being methyl or ethyl, preferably ethyl, the dialkylphthalat of formula (II) being the internal donor and
recovering said transesterification product as the procatalyst composition (component (i)).

The adduct of the formula MgCl₂*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic composition (HECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \qquad (IIIa)$$

wherein R⁵ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that R⁵ is selected from the group consisting of iso-propyl, iso-butyl, iso-pentyl, tert.- butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \quad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane [$Si(OCH_3)_2$(cyclo-pentyl)$_2$], diisopropyl dimethoxy silane [$Si(OCH_3)_2$(CH($CH_3$)$_2$)$_2$].

Most preferably the external donor is dicyclopentyl dimethoxy silane [$Si(OCH_3)_2$(cyclo-pentyl)$_2$] (Donor D).

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic composition (HECO) according to this invention. The polymerized vinyl compound can act as an α-nucleating agent.

It is particularly preferred that the polymerized vinyl compound is the first α-nucleating agent (NU1).

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The Polyethylene (PE)

The polyethylene (PE) is a copolymer of ethylene and a $C_4$-$C_{12}$ α-olefin. Accordingly, it is preferred that the polyethylene is a low density polyethylene (LDPE), like a linear low density polyethylene (LLDPE).

In a preferred embodiment, the polyethylene (PE) has a density 1000 kg/m³. More preferably, the density of the polyethylene (PE) is in the range of 890 to 940 kg/m³, still more preferably in the range of 900 to 930 kg/m³, like in the range of 915 to 925 kg/m³.

Preferably, the polyethylene (PE) has a melt flow rate $MFR_5$ (190° C., 5.0 kg) determined according to ISO 1133 equal or below 3.0 g/10 min, more preferably in the range of 0.1 to 2.0 g/10 min, still more preferably from 0.3 to 1.0 g/10 min, like a range from 0.5 to 0.95 g/10 min.

Preferably, the polyethylene (PE) comprises units derived from ethylene and a $C_4$-$C_{12}$ α-olefin.

In particular, the polyethylene (PE) comprises, preferably consists of, units derivable from (i) ethylene and (ii) at least another $C_4$-$C_{12}$ α-olefin, like $C_4$-$C_{10}$ α-olefin, more preferably units derivable from (i) ethylene and (ii) at least another α-olefin selected form the group consisting of 1-butene, 1-pentene, 1-hexene, 1-heptene and 1-octene. It is especially preferred that the polyethylene (PE) comprises at least units derivable from (i) ethylene and (ii) 1-butene or 1-octene.

In an especially preferred embodiment, the polyethylene (PE) consists of units derivable from (i) ethylene and (ii) 1-butene.

The comonomer content, like the $C_4$-$C_{12}$ α-olefin content, preferably 1-butene content, of the polyethylene (PE) is in the range of 2.0 to 15.0 mol-%, more preferably in the range of 2.5 to 10.0 mol-%, still more preferably in the range of 3.0 to 8.0 mol-%, like in the range of 4.0 to 6.0 mol-%.

The polyethylene (PE) according to this invention is preferably produced in a sequential polymerization process, i.e. in a multistage process, known in the art, wherein the polyethylene (PE) is produced at least in one slurry reactor, preferably in a slurry reactor and optionally in a subsequent gas phase reactor.

Preferably, the polyethylene (PE) is a linear low density polyethylene (LLDPE) known in the art. A non-limiting example for an appropriate polyethylene (PE) is the commercial polyethylene FB2230 by Borouge.

The Second α-Nucleating Agent (NU2)

The polypropylene composition (C) further comprises a second α-nucleating agent (NU2) which is different from the first α-nucleating agent (NU1) of the heterophasic propylene copolymer (HECO).

Preferably, the second α-nucleating agent (NU2) is a non-polymeric nucleating agent.

The second α-nucleating agent (NU2) is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4, 6,-di-tert-butylphenyl) phosphate or aluminum-hydroxy-bis[2,2'-methylene-bis(4,6-di-t-butylphenyl)phosphate],
(iv) talc, and
(v) mixtures thereof.

Such additives are generally commercially available and are described, for example, in "Plastic Additives Handbook", pages 871 to 873, 5th edition, 2001 of Hans Zweifel.

It is especially preferred that the second α-nucleating agent (NU2) is talc.

The polypropylene composition (C) comprises at least 1.4 wt.-%, preferably, 1.4 to 5.0 wt.-%, more preferably 1.6 to 4.0 wt.-%, still more preferably 1.8 to 3.0 wt.-%, like 1.9 to 2.2 wt.-% of the second α-nucleating agent (NU2).

According to this invention, nucleating agents such as the first α-nucleating agent (NU1) and the second α-nucleating agent (NU2) do not belong to the class of additives (AD).

The Additives (AD)

In addition to the heterophasic propylene copolymer (HECO) comprising a (semi)crystalline polypropylene (PP1), an elastomeric ethylene/propylene copolymer (EPR) dispersed in said (semi)crystalline polypropylene (PP1) and a first α-nucleating agent (NU1), the polyethylene (PE) and the second α-nucleating agent (NU2), the polypropylene composition (C) according to the present invention may include additives (AD). Typical additives are acid scavengers, antioxidants, colorants, light stabilisers, plasticizers, slip agents, anti-scratch agents, dispersing agents, processing aids, lubricants, pigments, and the like. As indicated above the nucleating agents are not regarded as additives (AD).

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the polypropylene composition (C) of the invention does not comprise (a) further polymer(s) different to the (semi)crystalline polypropylene (PP1), the elastomeric ethylene/propylene copolymer (EPR) and the polyethylene (PE), in an amount exceeding 15 wt.-%, preferably in an amount exceeding 10 wt.-%, more preferably in an amount exceeding 9 wt.-%, based on the weight of the polypropylene composition (C). If an additional polymer is present, such a polymer is typically a polymeric carrier material for the additives (AD). Any carrier material for additives (AD) is not calculated to the amount of polymeric compounds as indicated in the present invention, but to the amount of the respective additive.

The polymeric carrier material of the additives (AD) is a carrier polymer to ensure a uniform distribution in the polypropylene composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The polypropylene composition (C) of the present invention is preferably used for the production of articles, more preferably of molded articles, yet more preferably of injection molded articles. Even more preferred is the use for the production of parts of car seats, strollers, baby walkers, toys, heavy duty pails or transport packagings and the like.

The current invention also provides articles, more preferably molded articles, like injection molded articles, comprising, preferably comprising at least 60 wt.-%, more preferably at least 80 wt.-%, yet more preferably at least 95 wt.-%, like consisting of, the inventive polypropylene composition (C). Accordingly the present invention is especially directed to parts of car seats, strollers, baby walkers, toys, heavy duty pails or transport packagings and the like, comprising, preferably comprising at least 60 wt.-%, more preferably at least 80 wt.-%, yet more preferably at least 95 wt.-%, like consisting of, the inventive polypropylene composition (C).

The Use

The present invention is also directed to the use a composition comprising a polyethylene (PE) being a copolymer of ethylene and a $C_4$-$C_{12}$ α-olefin and an α-nucleating agent (NU2) as described above as an impact modifier for an α-nucleated heterophasic composition (HECO) comprising an α-nucleating agent (NU1) as described above.

Preferably, said impact modifier composition comprises the polyethylene (PE) being a copolymer of ethylene and a $C_4$-$C_{12}$ α-olefin and the α-nucleating agent (NU2) in a weight ratio of 15:1 to 1:1, more preferably in a weight ratio of 10:1 to 2:1, still more preferably in a weight ratio of 7:1 to 3:1, like in a weight ratio of 5:1.

Preferably, the α-nucleating agent (NU2) is different from the α-nucleating agent (NU1).

In particular, it is preferred that the α-nucleating agent (NU1) is the first α-nucleating agent (NU1) as described above and the α-nucleating agent (NU2) is the second α-nucleating agent (NU2) as described above.

Therefore, it is preferred that the α-nucleating agent (NU1) is selected from the group consisting of salts of monocarboxylic acids and polycarboxylic acids, e.g. sodium benzoate or aluminum tert-butylbenzoate, dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, salts of diesters of phosphoric acid, e.g. sodium 2,2'-methylenebis (4, 6,-di-tert-butylphenyl) phosphate or aluminum-hydroxy-bis[2,2'-methylene-bis(4,6-di-t-butylphenyl)phosphate], vinylcycloalkane polymer and vinylalkane polymer (as discussed in more detail below), and mixtures thereof.

The α-nucleating agent (NU2) is preferably selected from the group consisting of salts of monocarboxylic acids and polycarboxylic acids, e.g. sodium benzoate or aluminum tert-butylbenzoate, and (dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and salts of diesters of phosphoric acid, e.g. sodium 2,2'-methylenebis (4, 6,-di-tert-butylphenyl) phosphate or aluminum-hydroxy-bis[2,2'-methylene-bis(4,6-di-t-butylphenyl)phosphate], talc, and mixtures thereof.

It is especially preferred that the α-nucleating agent (NU1) is a polymeric nucleating agent and the α-nucleating agent (NU2) is a non-polymeric nucleating agent.

In particular, it is preferred that the α-nucleating agent (NU1) is a vinylcycloalkane polymer or vinylalkane polymer and the α-nucleating agent (NU2) is talc.

The present invention will now be described in further detail by the examples provided below.

EXAMPLES

1. Measuring Methods

The following definitions of terms and determination methods apply for the above general description of the invention as well as to the below examples unless otherwise defined.

$MFR_2$ (230° C.) is measured according to ISO 1133 (230° C., 2.16 kg load).

$MFR_5$ (190° C.) is measured according to ISO 1133 (190° C., 5.0 kg load).

Calculation of melt flow rate $MFR_2$ (230° C.) of the second polypropylene fraction (PP1b), i.e. the polymer fraction produced in the second reactor (R2), of the heterophasic propylene copolymer (HECO):

$$MFR(PP1b) = 10^{\left[\frac{\log(MFR(PP1))-w(PP1a)\times\log(MFR(PP1a))}{w(PP1b)}\right]}$$

wherein
- w(PP1a) is the weight fraction [in wt.-%] of the first propylene polymer fraction, i.e. the polymer produced in the first reactor (R1),
- w(PP1b) is the weight fraction [in wt.-%] of the first second propylene polymer fraction, i.e. the polymer produced in the second reactor (R2),
- MFR(PP1a) is the melt flow rate $MFR_2$ (230° C.) [in g/10 min] of the first propylene polymer fraction, i.e. the polymer produced in the first reactor (R1),
- MFR(PP1) is the melt flow rate $MFR_2$ (230° C.) [in g/10 min] of the first and second propylene polymer fractions, i.e. the polymer produced in the first and second reactor (R1+R2),
- MFR(PP1b) is the calculated melt flow rate $MFR_2$ (230° C.) [in g/10 min] of the second propylene polymer fraction, i.e. the polymer produced in the second reactor (R2).

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C\ \{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio defects:

$P_{total}=P_{12}+P_{21e}$

The mole percent of 2,1 erythro regio defects was quantified with respect to all propene:

[21e] mol %=100*($P_{21e}/P_{total}$)

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

$$E[\text{wt \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Intrinsic viscosity is measured according to DIN ISO 1628/1, October 1999 (in Decalin at 135° C.).

Density is measured according to ISO 1183-187. Sample preparation is done by compression moulding in accordance with ISO 1872-2:2007.

The xylene solubles (XCS, wt.-%): Content of xylene cold solubles (XCS) is determined at 25° C. according ISO 16152; first edition; 2005-07-01. The part which remains insoluble is the xylene cold insoluble (XCI) fraction.

DSC analysis, melting temperature ($T_m$) and crystallization temperature ($T_c$): measured with a TA Instrument Q200 differential scanning calorimetry (DSC) on 5 to 7 mg samples. DSC is run according to ISO 11357/part 3/method $C_2$ in a heat/cool/heat cycle with a scan rate of 10° C./min in the temperature range of −30 to +225° C. The crystallization temperature ($T_c$) is determined from the cooling step, while melting temperature ($T_m$) and melting enthalpy ($H_m$) are determined from the second heating step. The crystallinity is calculated from the melting enthalpy by assuming an Hm-value of 209 J/g for a fully crystalline polypropylene (see Brandrup, J., Immergut, E. H., Eds. Polymer Handbook, 3rd ed. Wiley, New York, 1989; Chapter 3).

Yellowness Index (YI) is a number calculated from spectrophotometry data that describes the change in color of a test sample from clear or white towards yellow. This test is most commonly used to evaluate color changes in a material caused by real or simulated outdoor exposure. The spectrophotometry instrument is a Spectraflash SF600 with Color-Tools software which calculate the yellowness index E 313 according to ASTM E313. On the sample holder and pipe sample is tested.

The yellowness index is rated as follows:

|  | Rating 1 | Rating 2 | Rating 3 | Rating 4 |
| --- | --- | --- | --- | --- |
| YI according to ASTM E313 | <(−0.9) | (−0.9)-1.5 | 1.5-6.5 | >6.5 |

Flexural Modulus: The flexural modulus was determined in 3-point-bending according to ISO 178 on injection molded specimens of 80×10×4 mm prepared in accordance with ISO 294-1:1996.

The impact strength is determined as Charpy Notched Impact Strength according to ISO 179-1 eA at +23° C. and at −20° C. on injection moulded specimens of 80×10×4 mm prepared according to EN ISO 1873-2.

2. Examples

A. Preparation of the Heterophasic Polypropylene Composition

Preparation of the Catalyst

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491566, EP 591224 and EP 586390.

The catalyst was further modified (VCH modification of the catalyst).

35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared above (Ti content 1.4 wt.-%) was added and after additionally 20 minutes 5.0 g of vinylcyclohexane (VCH) was added. The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight.

Preparation of the Heterophasic Polypropylene Compositions (HECO) and the Polypropylene Compositions (C)

The heterophasic polypropylene compositions (HECO) were prepared in a sequential process comprising a loop (bulk) reactor and two gas phase reactors. The reaction conditions are summarized in Table 1. Subsequently, the polypropylene compositions (C) were prepared by compounding the respective HECO with LLDPE, talc and additives as indicated in Table 2. The properties of the comparative and inventive compositions are summarized in Table 2.

As can be seen from the higher values for flexural modulus, stiffness can be significantly improved/maximized for all inventive examples, while impact strength as measured by the Charpy values, especially at +23° C., as well as processability, as evaluated by melt flow rate (MFR) values, both remain on a good/high level. Indeed, improvements of stiffness can be seen for all inventive examples that have higher flexural modulus values, while Charpy values, especially at +23° C., are comparable or higher to/over CE1 as well as comparable to CE2 and processabilty/MFR is better/higher than for CE2 and comparable to CE1.

TABLE 1

Preparation of the heterophasic propylene copolymers (HECO)

|  |  | CE1 | IE1 | IE2 | IE3 | IE4 | CE2 | IE5 | IE6 |
|---|---|---|---|---|---|---|---|---|---|
| Prepoly |  |  |  |  |  |  |  |  |  |
| TEAL/Ti | [g/t(C3)] | 150 | 150 | 150 | 150 | 150 | 150 | 150 | 150 |
| Donor | [g/t(C3)] | 40 | 40 | 40 | 40 | 40 | 40 | 40 | 40 |
| Temperature | [° C.] | 30 | 30 | 30 | 30 | 30 | 30 | 30 | 30 |
| Loop (Bulk) (R1) |  |  |  |  |  |  |  |  |  |
| Temperature | [° C.] | 80 | 80 | 80 | 80 | 80 | 80 | 80 | 80 |
| MFR | [g/10 min] | 40.0 | 68.9 | 76.4 | 95.5 | 81.0 | 35.0 | 73.4 | 87.0 |
| XCS | [wt.-%] | 1.5 | 1.8 | 1.9 | 1.7 | 1.6 | 1.5 | 1.6 | 1.6 |
| C2 (calc) | [mol %] | 0.3 | 0.3 | 0.3 | 0.3 | 0.3 | 0 | 00 | 0 |
| Split | [%] | 55 | 50 | 50 | 50 | 50 | 58 | 50 | 50 |
| $1^{st}$ GPR (R2) |  |  |  |  |  |  |  |  |  |
| Temperature | [° C.] | 85 | 85 | 85 | 85 | 85 | 85 | 85 | 85 |
| Pressure | [kPa] | 21 | 21 | 21 | 21 | 21 | 21 | 21 | 21 |
| MFR | [g/10 min] | 40.0 | 29.0 | 31.2 | 41.5 | 37.2 | 35.0 | 36.5 | 40.0 |
| XCS | [wt.-%] | 1.5 | 1.2 | 1.3 | 1.2 | 1.3 | 1.0 | 1.3 | 1.3 |
| Split | [%] | 45 | 50 | 50 | 50 | 50 | 42 | 50 | 50 |
| $2^{nd}$ GPR (R3) |  |  |  |  |  |  |  |  |  |
| Temperature | [° C.] | 70 | 70 | 70 | 70 | 70 | 70 | 70 | 70 |
| Pressure | [kPa] | 18 | 18 | 18 | 18 | 18 | 18 | 18 | 18 |
| MFR final | [g/10 min] | 20.0 | 17.1 | 21.5 | 24.2 | 18.5 | 12.0 | 17.4 | 24.0 |
| C2 final | [mol %] | 10.7 | 5.7 | 5.0 | 5.3 | 6.7 | 12.9 | 7.6 | 5.3 |
| XCS final | [wt %] | 18.0 | 12.2 | 9.8 | 10.7 | 13.6 | 24.0 | 14.4 | 10.5 |
| C2 (XCS) final | [mol %] | 43.6 | 45.0 | 46.6 | 49.0 | 46.7 | 47.9 | 47.5 | 45.9 |
| IV (XCS) final | [dl/g] | 2.60 | 3.23 | 3.46 | 4.48 | 4.28 | 2.60 | 4.47 | 4.13 |
| Split | [%] | 19 | 11 | 8.5 | 9.5 | 12.3 | 25 | 13.1 | 9.2 |

TABLE 2

Composition and properties of the comparative and inventive examples

|  |  | CE1 | IE1 | IE2 | IE3 | IE4 | CE2 | IE5 | IE6 |
|---|---|---|---|---|---|---|---|---|---|
| HECO | [wt.-%] | 98.85 | 89.35 | 89.35 | 89.35 | 89.35 | 98.85 | 89.35 | 89.35 |
| LLDPE | [wt.-%] | — | 10.0 | 10.0 | 10.0 | 10.0 | — | 10.0 | 10.0 |
| Talc | [wt.-%] | 0.7 | 2.0 | 2.0 | 2.0 | 2.0 | 0.7 | 2.0 | 2.0 |
| AD | [wt.-%] | 0.45 | 0.45 | 0.45 | 0.45 | 0.45 | 0.45 | 0.45 | 0.45 |
| MFR | [g/10 min] | 20.0 | 14.0 | 17.0 | 19.0 | 17.0 | 12.0 | 14.0 | 15.0 |
| Tm | [° C.] | 165.0 | 167.5 | 166.9 | 166.4 | 165.0 | 165.0 | 166.8 | 166.8 |
| Tcr | [° C.] | 129.0 | 130.7 | 131.3 | 130.9 | 132.0 | 127.0 | 131.6 | 131.3 |
| Flexural Modulus | [MPa] | 1450 | 1530 | 1578 | 1539 | 1520 | 1200 | 1430 | 1440 |
| Charpy NIS +23° C. | [kJ/m$^2$] | 8.5 | 11.0 | 8.2 | 10.0 | 11.0 | 14.0 | 13.0 | 13.0 |
| Charpy NIS −20° C. | [kJ/m$^2$] | 4.5 | 4.3 | 3.0 | 4.3 | 4.5 | 6.5 | 4.5 | 4.4 |

HECO is the respective heterophasic propylene copolymer HECO according to Table 1.
LLDPE is the commercial ethylene-butene copolymer FB2230 by Boroughe having a butene content of 4.36 mol.-%, a melt flow rate MFR$_5$ (190° C., 5.0 kg) of 0.95 g/10 min and a density of 922.5 kg/m$^3$.
Talc is the commercial Talc HM2L by Imi Fabi S.p.A. or Talc Euzenac A20C by Imerys.
AD is a masterbatch of Calcium Stearate, the commercial antioxidant Irganox 1010 by BASF, the commercial antioxidant Irgafos 168 by BASF, and the commercial antistatic agent GMS95.

The invention claimed is:

1. A polypropylene composition (C), comprising:
   (a) at least 80.0 wt. % of an α-nucleated heterophasic composition (HECO), comprising
     (a1) a (semi)crystalline polypropylene (PP1),
     (a2) an elastomeric ethylene/propylene copolymer (EPR) dispersed in said (semi)crystalline polypropylene (PP1),
     (a3) a first α-nucleating agent (NU1),
   (b) at least 5.0 wt. % of a polyethylene (PE) being a copolymer of ethylene and a $C_4$-$C_{12}$ α-olefin having a density in the range of 890 to 940 kg/m$^3$, and
   (c) at least 1.4 wt. % of a second α-nucleating agent (NU2) which is different from the first α-nucleating agent (NU1), based on the overall weight of the polypropylene composition (C).

2. The polypropylene composition (C) according to claim 1, wherein the heterophasic composition (HECO) has:
   i) a melt flow rate MFR$_2$ (230° C., 2.16 kg) determined according to ISO 1133 in the range of 5.0 to 40.0 g/10 min, and/or
   ii) a comonomer content in the range of 2.0 to 15.0 mol.

3. The polypropylene composition (C) according to claim 1, wherein the (semi)crystalline polypropylene (PP1) comprises at least two (semi)crystalline polypropylene fractions which differ in the melt flow rate MFR$_2$ (230° C., 2.16 kg) determined according to ISO 1133.

4. The polypropylene composition (C) according to claim 1, wherein the (semi)crystalline polypropylene (PP1) comprises:

(a) a first (semi)crystalline polypropylene fraction (PP1a) having a melt flow rate $MFR_2$ (230° C./2.16 kg) in the range of 30.0 to 120.0 g/10 min, and (b) a second (semi)crystalline polypropylene fraction (PP1b) having a melt flow rate $MFR_2$ (230° C./2.16 kg) in the range of 5.0 to 25.0 g/10 min.

5. The polypropylene composition (C) according to claim 1, wherein the heterophasic composition (HECO) has a xylene soluble fraction (XCS) in the range of 5.0 to 30.0 wt.-%.

6. The polypropylene composition (C) according to claim 1, wherein the xylene soluble fraction (XCS) of the heterophasic composition (HECO) has:

i) an ethylene content in the range of 25.0 to 60.0 mol-%, and/or ii) an intrinsic viscosity (IV) determined according to DIN ISO 1628/1, October 1999 (in Decalin at 135° C.) in the range of 3.0 to 4.5 dl/g.

7. The polypropylene composition (C) according to claim 1, wherein:

i) the first α-nucleating agent (NU1) is a polymeric nucleating agent, and ii) the second α-nucleating agent (NU2) is a non-polymeric nucleating agent.

8. The polypropylene composition (C) according to claim 7, wherein the first α-nucleating agent (NU1) is a polymeric vinylcycloalkane.

9. The polypropylene composition (C) according to claim 7, wherein the second α-nucleating agent (NU2) is selected from the group consisting of talc, salts of diesters of phosphoric acid or mixtures thereof.

10. The polypropylene composition (C) according to claim 1, comprising:

(a) 80.0 to 95.0 wt. % of the heterophasic composition (HECO), (b) 5.0 to 15.0 wt. % of the polyethylene (PE) being a copolymer of ethylene and a $C_4$-$C_{12}$ α-olefin, and (c) 1.4 to 5.0 wt. % of the second α-nucleating agent (NU2).

11. The polypropylene composition (C) according to claim 1, wherein the polyethylene (PE) is a copolymer of ethylene and 1-butene.

12. The polypropylene composition (C) according to claim 1, wherein the polyethylene (PE) has:

a melt flow rate $MFR_5$ (190° C., 5.0 kg) determined according to ISO 1133 equal or below 3.0 g/10 min.

13. The polypropylene composition (C) according to claim 1, having:

i) a flexural modulus determined according to ISO 178 of at least 1400 MPa, and/or ii) a Charpy notched impact strength determined according to ISO 179/1eA at 23° C. of at least 8.0 kJ/m².

14. The polypropylene composition (C) according to claim 1, wherein the (semi)crystalline polypropylene (PP1) is a propylene homopolymer (H-PP) comprising:

(a) a first propylene homopolymer fraction (H-PP1a) having a melt flow rate $MFR_2$ (230° C./2.16 kg) in the range of 30.0 to 120.0 g/10 min, and (b) a second propylene homopolymer fraction (H-PP1b) having a melt flow rate $MFR_2$ (230° C./2.16 kg) in the range of 5.0 to 25.0 g/10 min.

15. An article comprising the polypropylene composition (C) according to claim 1.

16. The article according to claim 15, wherein said article is a car seat, a stroller, a baby walker, a toy, a heavy duty pail or a transport packaging.

17. A method for preparing the polypropylene composition (C) according to claim 1, comprising the steps of:

i) preparing the α-nucleated heterophasic propylene copolymer (HECO) in a sequential polymerization process comprising at least three reactors, wherein the (semi) crystalline polypropylene (PP1) is produced in the first and/or second reactor in the presence of the first α-nucleating agent (NU1) and the elastomeric ethylene/propylene copolymer (EPR) is produced in a subsequent reactor, and ii) blending the α-nucleated heterophasic propylene copolymer (HECO) obtained in step i) with the polyethylene (PE) being a copolymer of ethylene and a $C_4$-$C_{12}$ α-olefin and the second α-nucleating agent (NU2).

* * * * *